United States Patent [19]

Wong

[11] Patent Number: 4,622,375

[45] Date of Patent: Nov. 11, 1986

[54] AMORPHOUS ETHYLENE/PROPYLENE POLYMERS

[75] Inventor: Pui K. Wong, Katy, Tex.

[73] Assignee: Shell Oil Company, Houston, Tex.

[21] Appl. No.: 846,315

[22] Filed: Mar. 28, 1986

[51] Int. Cl.$^4$ .............................................. C08F 12/32
[52] U.S. Cl. ................................. 526/284; 526/169.2
[58] Field of Search ......................................... 526/284

[56] References Cited

U.S. PATENT DOCUMENTS 4,540,763  9/1986  Kirchoff .............................. 526/281

Primary Examiner—Paul R. Michl
Attorney, Agent, or Firm—Dean F. Vance

[57] ABSTRACT

Solid amorphous copolymers of ethylene, propylene and an olefinic benzocyclobutene monomer of the formula

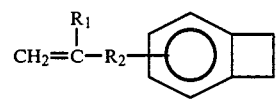

where $R_1$ is hydrogen or $CH_3$ and $R_2$ is $-CH_2-_n$ where n is 0 to 6 are claimed. Such copolymers can be easily crosslinked at temperatures above about 200° C., resulting in elastomers having improved creep resistance.

11 Claims, No Drawings

AMORPHOUS ETHYLENE/PROPYLENE POLYMERS

FIELD OF THE INVENTION

The present invention relates broadly to amorphous ethylene/propylene copolymers and processes for preparing the same. More particularly, the present invention relates to copolymers of ethylene, propylene and a certain benzocyclobutene derivative.

BACKGROUND OF THE INVENTION

The polymerization of α-monoolefins to useful thermoplastic polymer by catalysis employing coordination catalysts is well known. Coordination catalysts are used to copolymerize ethylene with many other α-olefins to prepare high molecular weight, linear, substantially crystalline polymers. When mixtures of olefins are polymerized with certain of these coordination catalysts, e.g. $VOCl_3$ and diethylaluminum chloride, amorphous, elastomeric polymers are formed. Those copolymers made from ethylene and propylene have found wide interest and commercial usefulness. These ethylene-propylene copolymers (termed "EPR") are saturated and, thus, cannot be suflur-cured but require a peroxide or other sperical cure. Random EPR's typically contain about 30 to 70 percent weight ethylene.

EPR's are desirable rubbers because these are prepared from low-cost monomers and have good mechanical and elastic properties, as well as outstanding resistance to ozone, heat and chemical attack. One disadvantage of such polymers is their poor creep resistance. Poor creep resistance means that such polymers are deficient for applications under load. One means of improving creep resistance of EPR's is to crosslink the polymer with peroxides. However, such crosslinking is not without its associated problems such as unpleasant odors and difficult curing procedures, interference by certain stabilizers which are radical inhibitors, and removal of peroxide decomposition products.

A new ethylene/propylene polymer has now been found that does not need to be crosslinked with peroxides, since it possesses its own unique crosslinking capability.

SUMMARY OF THE INVENTION

The present invention deals broadly with a novel and non-obvious ethylene/propylene copolymer and a process for preparing the same. In particular, the present invention relates to a solid, substantially amorphous copolymer of ethylene, propylene and an olefinic benzocyclobutene monomer of the formula:

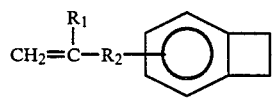

where $R_1$ is hydrogen or $CH_3$ and $R_2$ is $-(CH_2)_n-$ where n is 0 to 6. Further, the present invention also relates to a process for preparing such a solid, amorphous polymer, said process comprising copolymerizing ethylene, propylene and an olefinic benzocyclobutene monomer of the formula:

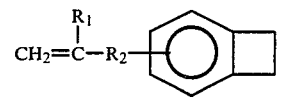

where $R_1$ is hydrogen or $CH_3$ and $R_2$ is $-(CH_2)_n-$ where n is 0 to 6, in the presence of a certain polyolefin coordination catalyst.

DETAILED DESCRIPTION OF THE INVENTION

Advantages of the Invention

The incorporation of latent curing sites into the polymer eliminates difficult blending procedures and unpleasant odors. The cured rubber would contain no residual unsaturation and thus should be more resistant to oxidative and thermal degradation. (Ref. H. J. Harwood, *J. Testing and Evaluation,* 289 (1983)).

The polymers of the present invention may be used to replace commercial EPR's in whole or in part, and are useful in the standard uses of EPR, such as molded and extruded goods (e.g. hose, gaskets, belts, etc). See generally, Elastomers, Synthetic, Kirk-Othmer Encyclopedia of Chemical Technology, Volume 7, pages 686–692 (Interscience Publishers 1965).

Olefinic Benzocyclobutene Monomer

The key aspect of the present invention involves the incorporation of a particular benzocyclobutene monomer in the polymerization process and the product. The olefinic benzocyclobutene monomers employed herein have the general formula:

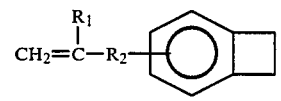

where $R_1$ is hydrogen or a $CH_3$ radical and $R_2$ is $-(CH_2)_n-$ where n is 0 to 6. Preferably, $R_1$ is H and n is 0 to 2. A preferred group of olefinic benzocyclobutene monomers includes:

| Monomer | Abbreviation |
| --- | --- |
| 4-(3-butenyl)benzocyclobutene | 4BBC |
| 3-(3-butenyl)benzocyclobutene | 3BBC |
| 4-allylbenzocyclobutene | 4ABC |
| 3-allylbenzocyclobutene | 3ABC |
| 4-vinylbenzocyclobutene | 4VBC |
| 3-vinylbenzocyclobutene | 3VBC |
| 4-isopropenylbenzocyclobutene | 4IBC |
| 3-isopropenylbenzocyclobutene | 3IBC |

The first six monomers cited above are more preferred with 4BBC being most preferred.

As shown in Illustrative Embodiment I, the thermal electrocyclic ring-opening of such benzocyclobutene monomers is the key to their particular usefulness in the present invention. Such monomers should have very good stability up to at least 100° C. ($t_{\frac{1}{2}} = 12$ years at 100° C. for benzocyclobutene) and high reactivity at elevated temperature ($t_{\frac{1}{2}} = 1.5$ minutes at 250° C. for benzocyclobutene).

The relative amount of olefinic benzocyclobutene monomer depends upon the degree of "crosslinking"

ultimately desired. The following table shows the preferred ranges (in mole percent in the product):

|  | Preferred | More Preferred |
| --- | --- | --- |
| Ethylene monomer | 20 to 80 | 40 to 75 |
| Propylene monomer | 80 to 20 | 60 to 30 |
| Olefinic benzocyclobutene monomer | 0.1 to 20 | 0.1 to 10 |
| TOTAL | 100% | 100% |

The polymers of the present invention have a random structure and number average molecular weight of about 50,000 and about 300,000.

Catalysts

A number of different coordination catalysts of the Ziegler-Natta type are useful in the process of this invention. Broadly, such catalysts comprise a pro-catalyst which is a solid compound of a transition metal of group IV to VIII of the Periodic Table and a cocatalyst which is an alkyl compound, including alkyl halides and hydrides, of a metal of groups I to III. It is now well known that only a limited number of these compounds are practical for effectively converting a given monomer into a desired polymer. In general, the same catalysts which are effective for the polymerization of a particular monomer feed in a conventional polymerization process are also effective for the same conversion in the process of this invention.

Zielger-Natta coordination catalysts are discussed in detail in the book "Ziegler-Natta Catalysts and Polymerizations" by John Boor, Jr., Academic Press, 1979 and in numerous patents and review articles, including those cited by Boor.

Preferred catalysts include halides or alkoxyhalides of a transition metal such as zirconium, vanadium, chromium and molybdenum. In the active catalyst the transition metal is at a valance below its maximum. Among the halogens the order of preference runs from chlorides to bromides to iodides to fluorides.

Preferred catalysts are $VOCl_3$ and diethylaluminum chloride. See generally U.S. Pat. No. 3,000,866, U.S. Pat. No. 3,063,973 and U.S. Pat. No. 3,093,621 for suitable catalysts and reaction conditions.

The olefinic benzocyclobutene monomer and ethylene/propylene monomers are copolymerized in a manner similar or identical to that used in the polymerization and copolymerization of alpha monoolefin monomers. These polymerizations may be carried out by any one of the conventional techniques, such as gas phase polymerization or slurry polymerization using liquid monomer or an inert hydrocarbon diluent as liquid medium. Hydrogen may be used to control the molecular weight of the polymer without detriment to the performance of the catalyst compositions. Polymerization may be effected batchwise or continuously with constant or intermittent supply of the catalyst to the polymerization reactor(s).

Polymerization, as well as catalyst preparation, is carried out in the absence of air and water or in the presence of only very limited amounts of these, since otherwise the catalyst would be deactivated. Desired polymerization temperatures are between 20° C. and 100° C., preferably between 40° C. and 80° C.

The catalysts employed in the production of the subject copolymers may be of sufficiently high activity that no product deashing step is required. If catalyst residues are to be deactivated and removed, this may be accomplished by conventional means employed in cleanup of olefin polymers produced over such catalysts, e.g., by contact with an alcohol, followed by extraction with water.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

Illustrative Embodiment I

A key aspect of the present invention deals with the ring-opening of the benzocyclobutene monomers to reactive o-quinodimethanes. In this embodiment, half-life values for the parent benzocyclobutene are calculated and summarized in the following Table 1, based on activation parameters reported in W. R. Roth et al, Chem. Ber. 111, 3892–3903 (1978). The results suggest that reactive oligomers and polymers containing benzocyclobutenes which are not substituted at the cyclobutene ring would have long shelf-life and good reactivity at >200° C.

TABLE 1

Benzocyclobutene $\xrightarrow{k}$ o-quinodimethane

| T (°C.) | k (sec$^{-1}$) | t$_\frac{1}{2}$ (hr) |
| --- | --- | --- |
| 25 | 2.5 × 10$^{15}$ | 7.6 × 10$^{10}$ |
| 100 | 1.7 × 10$^{-9}$ | 1.1 × 10$^{5}$ |
| 150 | 9.6 × 10$^{-7}$ | 2 × 10$^{2}$ |
| 200 | 1.4 × 10$^{-4}$ | 1.4 |
| 250 | 7.8 × 10$^{-3}$ | 2.5 × 10$^{-2}$ |

Illustrative Embodiment II

With the exception of polyethylene and EPDM elastomer, it is difficult to crosslink or introduce functional groups into polyolefins. By incorporating benzocyclobutene into polyolefins and using its thermal reactivity to form carbon-carbon bonds, it is possible to make new products such as high temperature ethylene-propylene elastomers. This embodiment describes the preparation of reactive polyolefins via Ziegler-Natta polymerization using ethylene/propylene and 4-(3-butenyl)-benzocyclobutene (4BBC) as model compounds.

4BBC was prepared from 4-chloromethylbenzocyclobutene in a two-step process with an overall yield of 60% as follows.

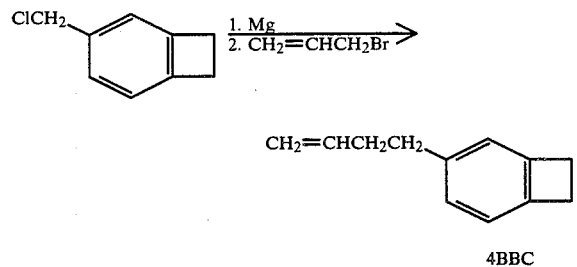

The structure of 4BBC was confirmed by $^1$H and $^{13}$C NMR. GC analysis showed it to be >99% pure.

In a 2-liter resin kettle, 1 liter of toluene was rapidly stirred and sparged with purified nitrogen for 20 minutes at 20° C. Streams of propylene and ethylene were introduced. Feed rates of 0.5, 1.0 and 2.0 liters/min. for ethylene, propylene and nitrogen, respectively, were maintained throughout the reaction. After 20 minutes, 1 g of 4-(3-butenyl)lbenzocyclobutene, 0.173 g (1 mmol) of vanadium(V) trichloride oxide in 5 ml of toluene, and 2.47 g (10 mmol) of triethyldialuminum trichloride in 10 ml of toluene were added in rapid succession to give a deep purple color solution which gradually faded to a very pale purple color. After 10 minutes, four additional portions of 0.5 g of 4-(3-butenyl)benzocyclobutene, 0.2 mmol of vanadium(V) trichloride oxide in 1 ml of toluene, and 2 mmol of triethyldialuminum trichloride in 2 ml of toluene were added in 10-min intervals. The polymerization was allowed to proceed another 20 minutes after the final addition; then 20 ml of isopropanol was added to deactivate the catalyst. The polymer was precipitated from methanol, washed three times in a Waring blender with methanol, and dried in vacuo at 65° C. to give 12.5 g of a rubbery polymer. $^1$H NMR analysis of the polymer in 1,12,2-tetrachloroethane showed the characteristic resonance of benzocyclobutene at δ3.09 ppm. The composition of the terpolymer was estimated by NMR to contain approximately 0.15%m 4-(3-butenyl)benzocyclobutene, 74%m ethylene, and 25.7%m propylene.

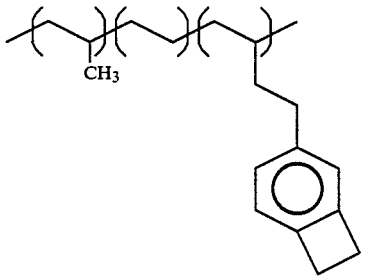

What is claimed is:

1. A solid substantially amorphous copolymer of ethylene, propylene and an olefinic benzocyclobutene monomer of the formula:

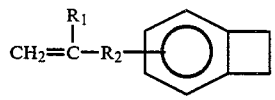

where $R_1$ is hydrogen or $CH_3$ and $R_2$ is $-(CH_2)_n$ where n is 0 to 6.

2. The copolymer of claim 1 comprising about 20 to about 80 mole percent ethylene, about 80 to about 20 mole percent propylene and about 0.1 to about 20 mole percent olefinic benzocyclobutene.

3. The copolymer of claim 1 wherein said olefinic benzocyclobutene monomer is selected from the group consisting of:
4-(3-butenyl)benzocyclobutene
3-(3-butenyl)benzocyclobutene
4-allylbenzocyclobutene
3-allylbenzycyclobutene
4-vinylbenzocyclobutene, and
3-vinylbenzocyclobutene.

4. The copolymer of claim 1 wherein $R_1$ is hydrogen and n is 0 to 2.

5. The copolymer of claim 1 wherein said olefinic benzocyclobutene monomer is 4-(3-butenyl)benzocyclobutene.

6. A solid copolymer having improved creep resistance prepared by heating the copolymer of claim 1 to a temperature above about 200° C.

7. A process for preparing a solid substantially amorphous polymer comprises copolymerizing ethylene, propylene and an olefinic benzocyclobutene monomer of the formula:

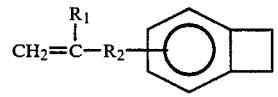

where $R_1$ is hydrogen or $CH_3$ and $R_2$ is $-(CH_2)_n$ where n is 0 to 6, in the presence of a polyolefin coordination catalyst.

8. The process of claim 7 wherein the amounts of ethylene, propylene and benzocyclobutene monomer employed in the process are such that the resulting copolymer comprises about 20 to about 80 mole percent ethylene, about 80 to about 20 mole percent propylene and about 0.1 to about 20 mole percent olefinic benzocyclobutene.

9. The process of claim 7 wherein said olefinic benzocyclobutene monomer is selected from the group consisting of:
4-(3-butenyl)benzocyclobutene
3-(3-butenyl)benzocyclobutene
4-allylbenzocyclobutene
3-allylbenzycyclobutene
4-vinylbenzocyclobutene, and
3-vinylbenzocyclobutene.

10. The process of claim 7 wherein said olefinic benzocyclobutene monomer is 4-(3-butenyl)benzocyclobutene.

11. The process of claim 7 wherein said coordination catalyst is a vanadium(V) trichloride oxide-triethyldialuminum trichloride catalyst.

* * * * *